(No Model.)

C. H. PASCHKE.
BICYCLE TIRE.

No. 584,648. Patented June 15, 1897.

WITNESSES:
Edward Thorpe

INVENTOR
C. H. Paschke
BY
ATTORNEYS.

UNITED STATES PATENT OFFICE.

CHARLES H. PASCHKE, OF CHICAGO, ILLINOIS.

BICYCLE-TIRE.

SPECIFICATION forming part of Letters Patent No. 584,648, dated June 15, 1897.

Application filed October 6, 1896. Serial No. 607,980. (No model.)

*To all whom it may concern:*

Be it known that I, CHARLES H. PASCHKE, of Chicago, in the county of Cook and State of Illinois, have invented a new and Improved Bicycle-Tire, of which the following is a full, clear, and exact description.

The object of the invention is to provide a new and improved bicycle-tire which is simple and durable in construction, very light, and arranged to enable the rider to readily adjust the tire to any degree of elasticity for insuring easy riding.

The invention consists principally of an outer rim made of a series of wires bent into ring shape and connected with each other by cross-bars, the outer ends of the wires being connected with each other by an adjustable coupling.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
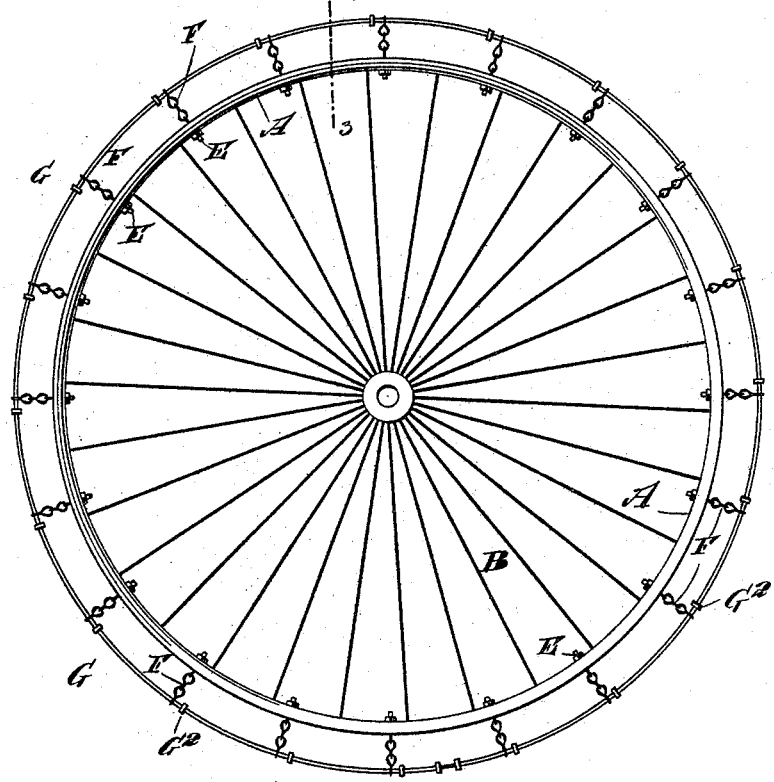
Figure 2:
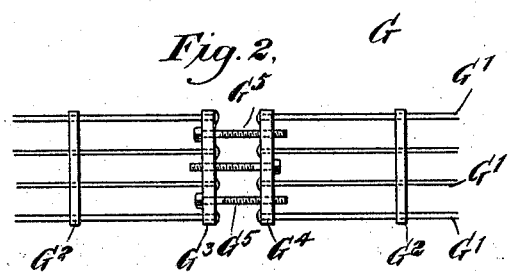
Figure 3:
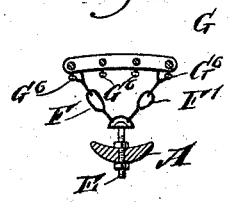

Figure 1 is a side elevation of the improvement. Fig. 2 is an enlarged plan view of the coupling for the outer rim, and Fig. 3 is an enlarged cross-section of the improvement on the line 3 3 of Fig. 1.

The improved bicycle-tire is provided with an inner fixed rim A, made of wood or other suitable material and connected by spokes B with the hub C. In the inner rim A are secured bolts E, each of which is connected at its outer end by chains F F' with the outer rim G, made of a series of wires G', bent into ring shape and transversely connected with each other by cross-bars $G^2$. The latter are preferably arranged near the connections of the chains F F' with the outer wires G', as plainly indicated in Figs. 1 and 3. The end pieces $G^3$ $G^4$ for the wires G' are connected with each other by screw-rods $G^5$, so that by screwing up the latter the end pieces can be drawn toward each other for tightening the wires according to the degree of elasticity desired. Now by the arrangement described the wires G' form the tread for the wheel to run upon, and as the said wires can give relatively to the fixed inner rim A, spokes B, and hub C it is evident that great elasticity, and consequently easy riding, is obtained. The cross-pieces $G^2$ are preferably secured in place on the wires by set-screws $G^6$, as indicated in Fig. 3.

It is expressly understood that the operator by adjusting the screw-rods $G^5$ and the bolts E can give any desired degree of elasticity to the tire.

Having thus described my invention, I claim as new and desire to secure by Letters Patent—

1. A bicycle-tire, provided with an outer rim comprising a series of wires bent into ring shape, and an adjustable coupling for connecting the ends of the wires with each other, substantially as shown and described.

2. A bicycle-tire, comprising an outer rim made of wires coupled together at their ends and connected with each other transversely by cross-bars, an inner fixed rim, and chain connections between the outer rim and the inner rim, substantially as shown and described.

3. A bicycle-tire, provided with an outer rim made of a series of wires bent into ring shape, cross-bars connecting the wires with each other, and rods connecting the cross-bars at the ends of the wires with each other, substantially as shown and described.

CHARLES H. PASCHKE.

Witnesses:
CHAS. KUNKEL,
GEORGE M. DUFFY.